United States Patent Office 3,305,245
Patented Feb. 21, 1967

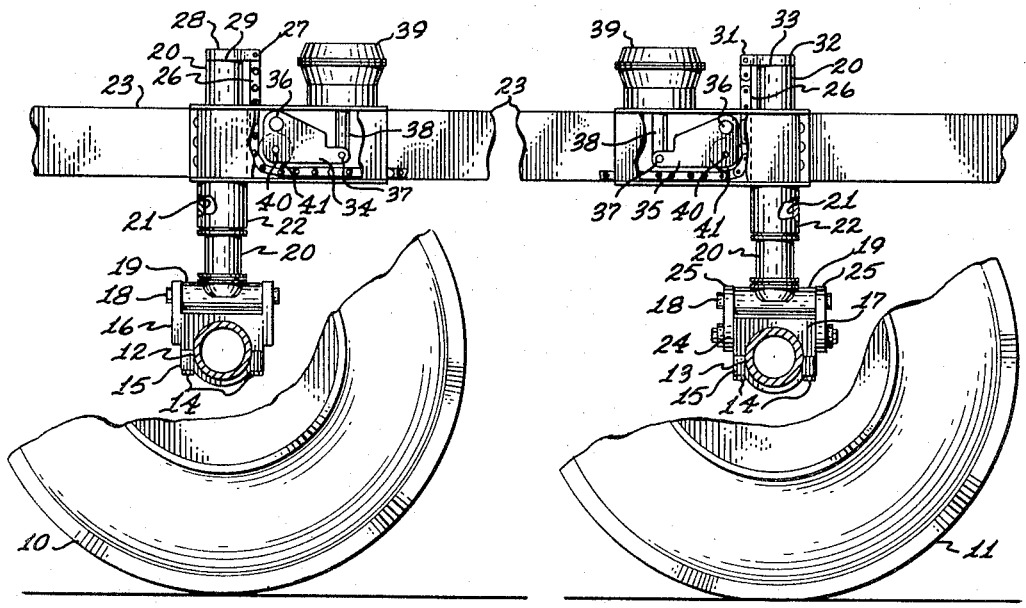
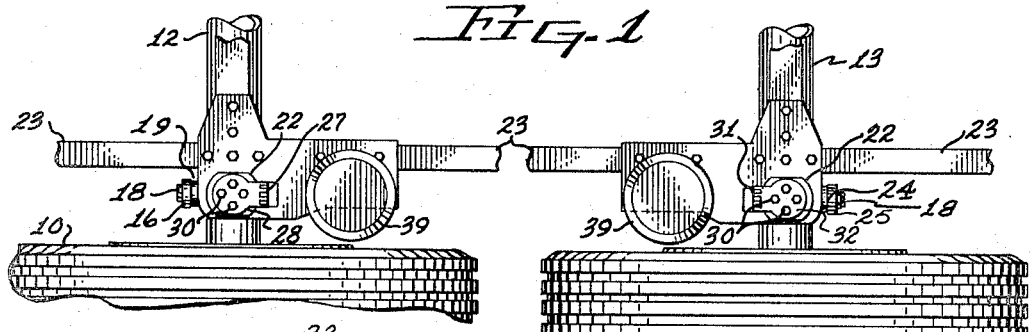
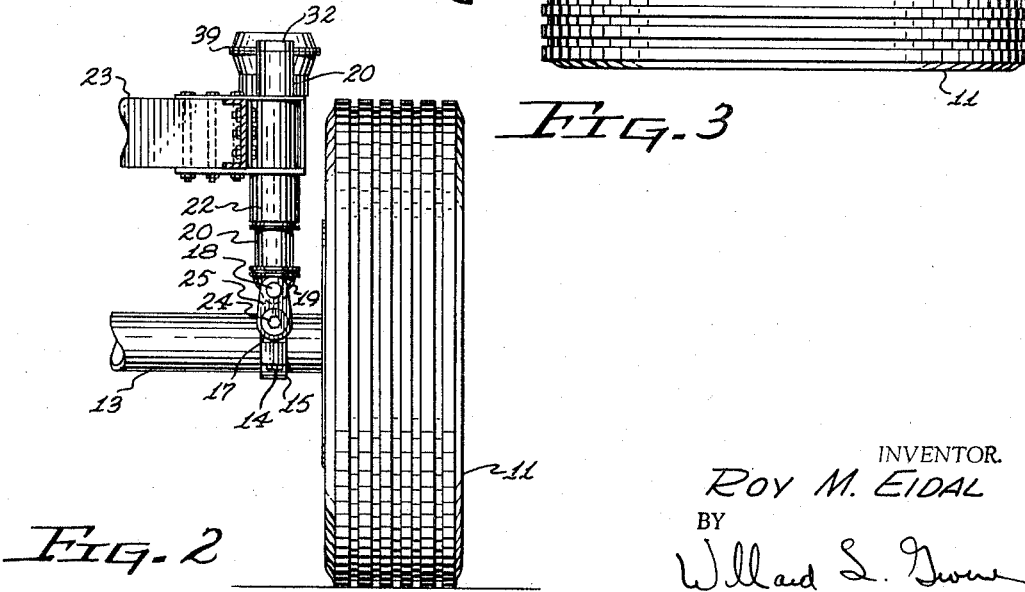

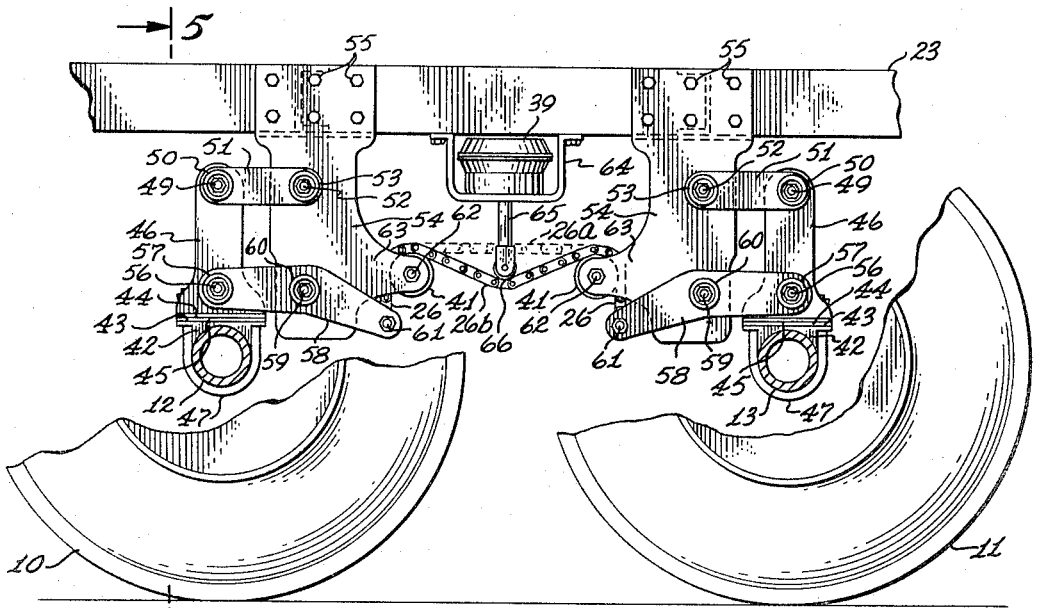
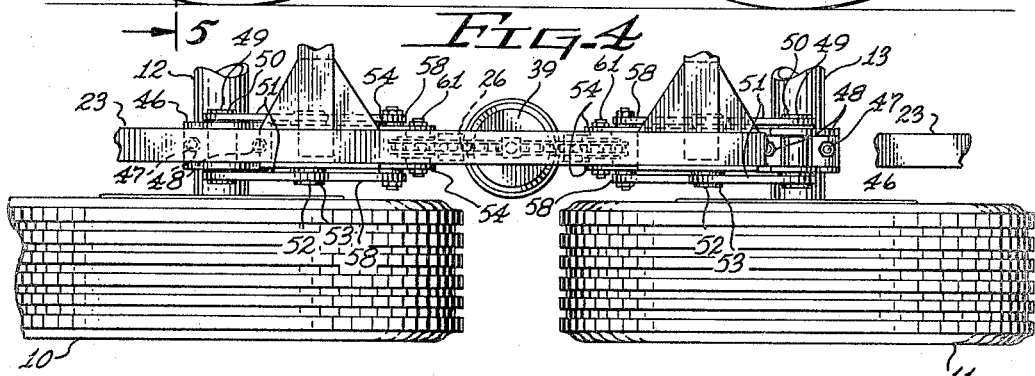
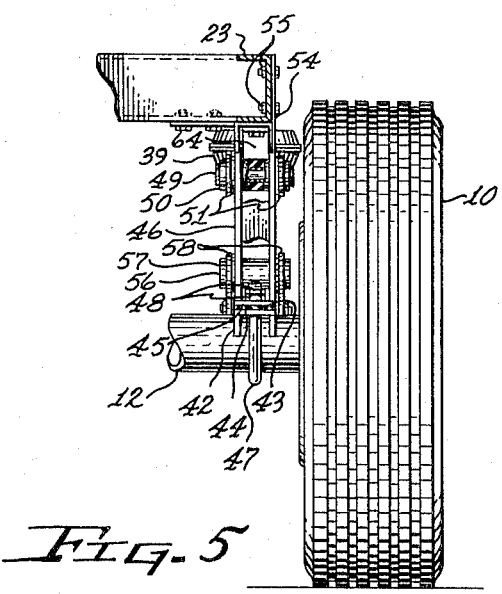

3,305,245
VEHICLE SUSPENSION SYSTEM
Roy M. Eidal, 250 Woodward Road SE.,
Albuquerque, N. Mex. 87102
Filed Dec. 29, 1964, Ser. No. 421,797
2 Claims. (Cl. 280—104.5)

This invention pertains to vehicle suspension systems and is particularly directed to chain suspension system particularly adapted to heavy load carrying trailers and they like.

One of the objects of this invention is to provide a suspension system that is free of vibration and loose joints and which is readily adapted to various loads and empty conditions for the vehicle so as to preserve good riding qualities and long tire life under all operating conditions.

Another object is to provide a chain suspension system for a multi-wheel trailer that allows the wheels free and independent vertical movements in response to irregularities in the road surface while tying their movements together through a chain tensioned through air suspension cylinders supporting the load carrying bed of the vehicle.

A further object is to tie together the vertical movements of the various road wheels through an interconnecting chain and to suspend the load carrying by lateral pressure applied to the side of the interconnecting chain.

Another object is to provide a chain suspension system for a motor vehicle that is free of sliding surfaces and springs so as to provide a suspension system of substantially friction free character and long life.

Further features and advantages of this invention will appear from a detailed description of the drawings in which:

FIG. 1 is a side elevation of a chain suspension system incorporating the features of this invention.

FIG. 2 is an enlarged fragmentary sectional view on the line 2—2 of FIG. 1.

FIG. 3 is a fragmentary plan view of the apparatus shown in FIG. 1.

FIG. 4 is a side elevation of a modification of the apparatus shown in FIG. 1.

FIG. 5 is an enlarged fragmentary sectional view on the line 5—5 of FIG. 4.

FIG. 6 is a fragmentary plan view of the apparatus shown in FIG. 4.

As an example of one embodiment of this invention, there is shown a vehicle such for example, a heavy duty trailer having forward road wheels 10 and rear road wheels 11 appropriately journaled on suitable transverse axles 12 and 13. Rigidly clamped to each of the axles 12 and 13 by suitable bolts 14 and caps 15 are the blocks 16 and 17. The block 16 is directly pivotally connected by a pin 18 to the lower end 19 of the guide column 20 which in turn is slidably mounted for vertical movement in the bore 21 of the guide sleeve 22 rigidly fixed to the frame 23 of the vehicle bed. The rear block 17 is pivotally connected at 24 to the lower ends of the links 25 whose upper ends are pivotally connected by the pin 18 to the lower end 19 of the rear guide column 20 which is slidably mounted for vertical movement in the bore 21 of the rear guide sleeve 22 rigidly fixed to the frame 23, this arrangement providing for the proper freedom of lateral articulated movement of the road wheels and axles in accommodation to irregularities in the road surface.

One form of the suspension system of this invention comprises a link chain 26, one end 27 of which is fixed to a block 28 rigidly secured to the upper end 29 of the forward guide column 20 by suitable screws 30 while the other end 31 of the chain 26 is fixed to a block 32 rigidly secured to the upper end 33 of the rear guide column 20. A pair of oppositely disposed idler levers 34 and 35 are each pivotally mounted on suitable pins 36 suitably fixed in the frame 23 adjacent the respective guide sleeves 22. The outer ends of the idler levers are each connected by a suitable pin 37 to the outer ends of the downwardly extending piston rods 38 of suitable fluid pressure cylinders 39 fixed to the frame 23. Suitably journaled on a pin 40 located intermediate the ends of the levers 34 and 35 and below the pins 36 are the idler rollers 41. As best seen in FIG. 1, the link chain extends downwardly from the block 28 around and under the idler roller 41, then horizontally rearwardly, then under and upwardly in contact with the other roller 41 to the block 32. It is to be understood that the described structure is provided for the road wheels 10 and 11 at both sides of the vehicle.

By applying appropriate pressure, such as air, in the cylinders 39 the outer ends 37 of the levers 34 and 35 are yieldingly held in a downwardly direction while the rollers 41 laterally engage and ride on and are supported by the chain 26 so as to support the frame 23 through the blocks 28 and 32 and guide columns 20 on the road wheels 10 and 11. It can thus be seen that upward movement of one set of forward wheels 10 relative to the frame 23 causes, through the chain 26, equivalent downward movement of the rear wheels 11 relative to the frame while the cylinders maintain a cushioned soft stable position in ride for the vehicle frame 23 and the bed and load carried thereon.

A modification of the above described apparatus incorporating the same basic principles of operation is shown in FIGS. 4, 5 and 6 in which the road wheels 10 and 11 and associated axles are each connected by a parallelogram linkage system to the frame 23 of the vehicle. To this end there is provided a saddle piece 42 rigidly fixed to the upper portion of each axle having a horizontal top surface 43 to which is applied a resilient pad 44 of suitable material on top of which rests the bottom surface 45 of the parallel motion vertical link 46. Suitable U-bolts 47 extending around the axles 12 and 13 and up through the plate 42, pad 44, and bottom 45 together with the nuts 48 serve to yieldingly secure the axles 12 and 13 to the vertical links while allowing sufficient movement therebetween for the articulated lateral movements of the respective axles and road wheels in response to the irregularities in the road surface.

The upper end of the vertical link 46 is pivotally connected at 49 by a suitable rubber bushing 50 to one end of the link 51 and the other end of the upper link 51 is pivotally connected at 52 by a rubber bushing 53 to a bracket 54 rigidly fixed to the vehicle frame 23 by appropriate bolts 55. Intermediate the ends of the vertical link 46 is pivotally mounted at 56 by a rubber bushing 57 one end of the control link 58 which in turn is pivotaly mounted intermediate its ends at 59 by a rubber bushing 60 on the lower end of the bracket below the pivotal connection 52 of link 51 so as to provide a parallelogram of vertical up and down movement for the link 46 and attached axles 12 and 13 and associated road wheels 10 and 11 free of all vertical sliding guide elements.

A chain 26 has its ends pivotally connected at 61 to the other ends of the control links 58 from the pivotal connection 56. The chain 26 extends up and over the idler rollers 41 journaled at 62 on the integral extension portions 63 of the brackets 54. A single fluid pressure cylinder 39 is fixed by a bracket 64 to the vehicle frame 23 and has a heavy downwardly extending piston rod 65 on the lower end of which is journaled a roller 66 which engages the chain 26 intermediate the rollers 41.

When fluid pressure, such as air, is applied to the cylinder, its piston roller 66 laterally deflects the chain between the rollers 41 from the substantially horizontal position 26a to the downwardly deflected position 26b, FIG. 4, of normal load carrying for the vehicle. Again upward movement of one wheel and axle 11–12 relative to the frame 23 through the chain 26, causes downward deflection of the other wheel and axles 10–13 relative to frame 26 to thus maintain a smooth cushioned level ride for the vehicle.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A vehicle suspension system comprising in combination:
   (A) a forward road wheel and axle assembly,
   (B) a rear road wheel and axle assembly,
   (C) a frame,
   (D) guide sleeves fixed on said frame,
   (E) a guide column fixed to each of said axles vertically reciprocatable in said guide sleeves,
   (F) a pair of horizontally spaced idler rollers,
   (G) an idler lever for each of said idler rollers pivotally mounted on said frame,
   (H) yielding fluid cylinders on said frame connected to actuate said idler levers to swing said idler rollers radially,
   (I) a length of chain having one end connected to one of said guide columns and its other end connected to the other of said guide columns and engaging said idler pulleys so that said guide columns are caused to move in opposite directions relative to said frame while said yielding fluid cylinders are arranged to control the relative vertical position of said frame to both of said wheel assemblies.

2. A vehicle suspension system comprising in combination:
   (A) a forward road wheel and axle assembly,
   (B) a rear road wheel and axle assembly,
   (C) a frame,
   (D) a vertical link fixed to each of said axles,
   (E) an upper link pivotally connected at one end to the upper end of said vertical link and pivotally connected at its other end to said frame,
   (F) a control link pivotally connected at one end to the lower portion of said vertical link and pivotally connected intermediate its ends to said frame,
   (G) a length of chain having its ends connected between the other ends of said lower links,
   (H) idler rollers journaled on said frame laterally supporting said chain so that said wheel and axle assemblies move in opposite vertical direction relative to said frame,
   (I) a fluid pressure device on said frame having an actuable element adapted to laterally engage said chain intermediate said rollers to simultaneously adjust the relative vertical position of said wheel and axle assemblies and said frame to desired load carrying position.

References Cited by the Examiner

UNITED STATES PATENTS 2,296,681  9/1942  Merry _____ 280—104.5
2,823,926  2/1958  Stover _____ 280—104.5

BENJAMIN HERSH, *Primary Examiner.*

P. GOODMAN, *Assistant Examiner.*